United States Patent [19]

Hinson et al.

[11] 4,048,533
[45] Sept. 13, 1977

[54] PHOSPHOR OVERCOAT

[75] Inventors: David C. Hinson, Whitehouse; Wolfgang W. Bode, Sylvania; Michael E. Fein; H. Joseph Hoehn, both of Toledo, all of Ohio

[73] Assignee: Owens-Illinois, Inc., Toledo, Ohio

[21] Appl. No.: 409,874

[22] Filed: Oct. 26, 1973

Related U.S. Application Data

[63] Continuation-in-part of Ser. No. 188,490, Oct. 12, 1971, abandoned.

[51] Int. Cl.² .............................................. H01J 1/62
[52] U.S. Cl. .................................. 313/188; 313/484; 313/489
[58] Field of Search ............... 313/108 B, 108 A, 188, 313/92 PH, 489, 201, 221

[56] References Cited

U.S. PATENT DOCUMENTS

| | | | |
|---|---|---|---|
| 2,205,809 | 6/1940 | Breadner et al. | 313/489 |
| 2,213,796 | 9/1940 | Zecher et al. | 313/489 |
| 2,238,784 | 4/1941 | Scott et al. | 313/489 |
| 2,762,943 | 9/1956 | Mayer | 117/33.5 C |
| 3,175,116 | 3/1965 | Fever | 313/108 A |
| 3,461,335 | 8/1969 | Lothaller | 313/226 |
| 3,559,190 | 1/1971 | Bitzer et al. | 313/201 X |
| 3,573,531 | 4/1971 | Kerstetter | 313/221 X |
| 3,614,511 | 10/1971 | Baker et al. | 313/188 R |
| 3,634,719 | 1/1972 | Ernsthausen | 252/518 |
| 3,701,916 | 10/1972 | Glaser | 313/484 |
| 3,716,742 | 2/1973 | Nakayama et al. | 313/188 X |
| 3,790,841 | 2/1974 | Tsui et al. | 313/108 B |
| 3,806,761 | 4/1974 | Bode et al. | 313/226 X |
| 3,823,394 | 7/1974 | Byrum, Jr. et al. | 313/221 |

OTHER PUBLICATIONS

Roberts; S., "Aging Characteristics of Electroluminescent Phosphors," JAP 28, 2-1957, pp. 262-265.

Primary Examiner—John K. Corbin
Assistant Examiner—Wm. H. Punter
Attorney, Agent, or Firm—Donald Keith Wedding

[57] ABSTRACT

There is disclosed a gas discharge device containing electrode arrays, an ionizable gaseous medium, and a phosphor excited at least in part by radiation from the gas discharge of the device, the life of the phosphor being increased by the application of a phosphor overcoat which is at least partially transmissive to excitation radiation from the gas discharge. The phosphor overcoat is typically selected from alkali and alkaline earth fluorides. In one embodiment, the gaseous medium comprises at least one rare gas selected from neon or argon and at least one other rare gas selected from argon, xenon, krypton. The gas discharge device is preferably of the display/memory type wherein electrical charges are stored on opposing dielectric surfaces, the phosphor and phosphor overcoat being positioned on the dielectric surfaces near the gas discharge.

13 Claims, 5 Drawing Figures

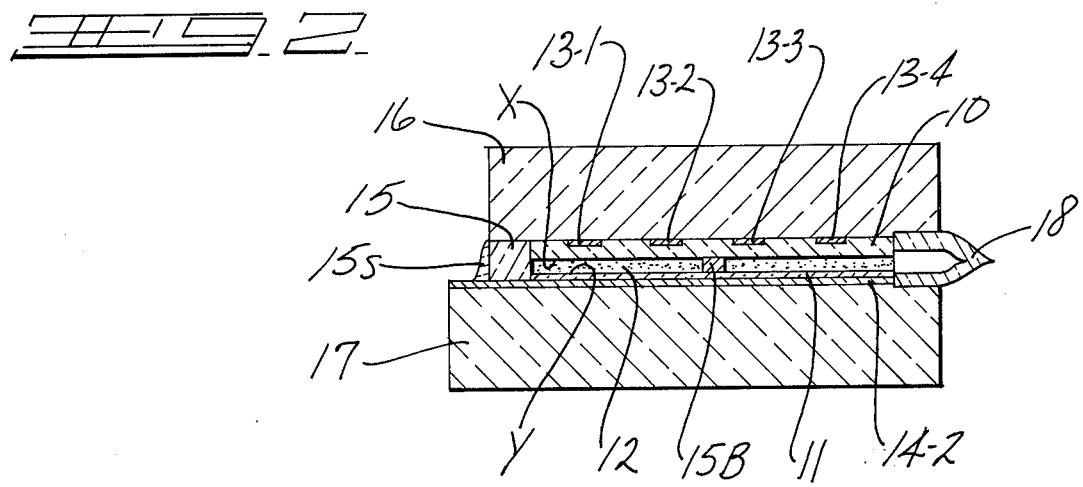

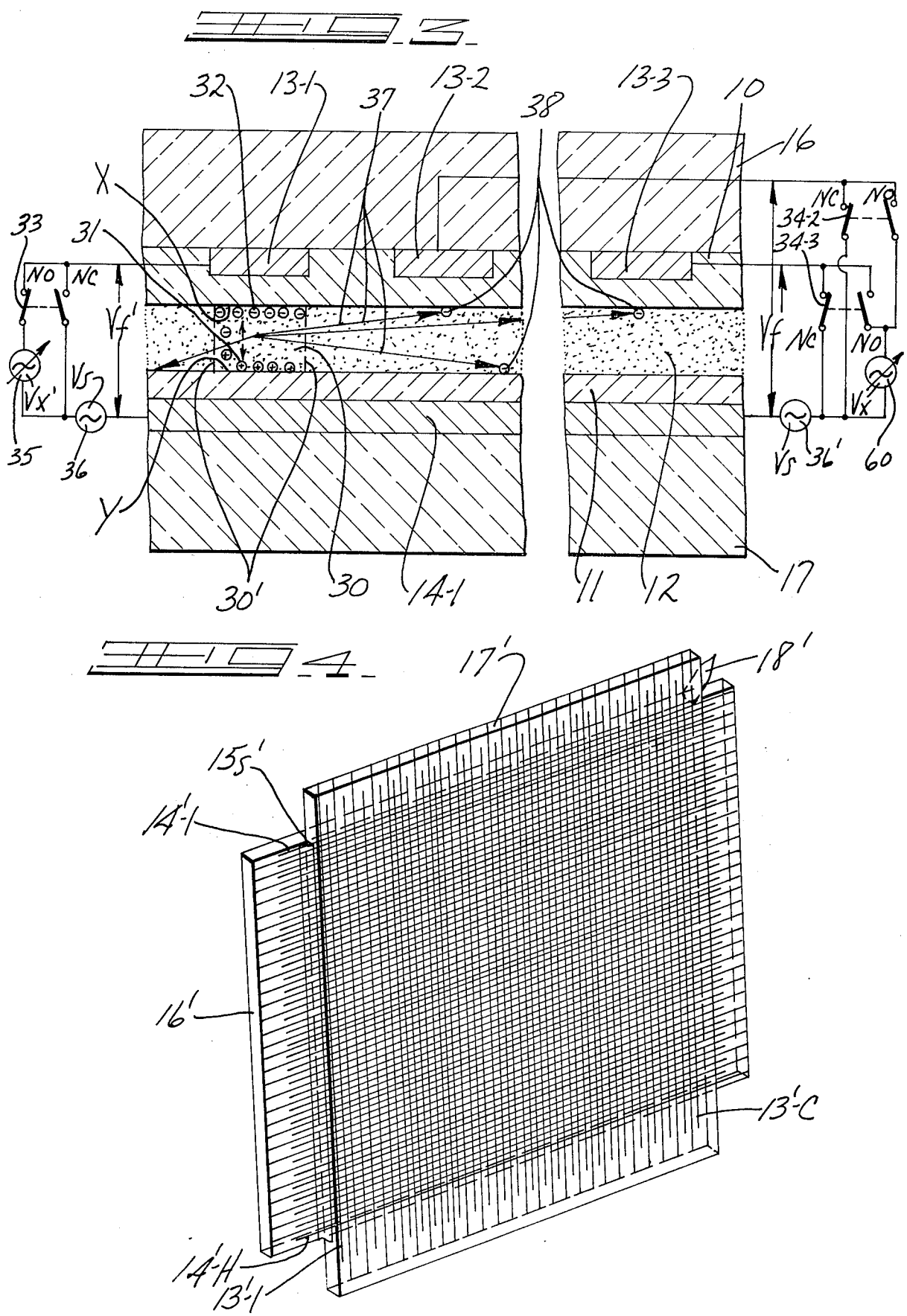

PHOSPHOR OVERCOAT

RELATED APPLICATION

This is a continuation-in-part of copending U.S. patent application Ser. No. 188,490, filed Oct. 12, 1971, now abandoned.

BACKGROUND OF THE INVENTION

This invention relates to gas discharge phosphor-containing devices, especially multiple gas discharge display/memory panels or units which have an electrical memory and which are capable of producing a visual display or representation of data such as numerals, letters, radar displays, aircraft displays, binary words, educational displays, etc.

Mulitple gas discharge display and/or memory panels of one particular type with which the present invention is concerned are characterized by an ionizable gaseous medium, usually a mixture of at least two gases at an appropriate gas pressure, in a thin gas chamber or space between a pair of opposed dielectric charge storage members which are backed by conductor (electrode) members, the conductor members backing each dielectric member typically being appropriately oriented so as to define a plurality of discrete gas discharge units or cells.

In some prior art panels the discharge cells are additionally defined by surrounding or confining physical structure such as apertures in perforated glass plates and the like so as to be physically isolated relative to other cells. In either case, with or without the confining physical structure, charges (electrons, ions) produced upon ionization of the elemental gas volume of a selected discharge cell, when proper alternating operating potentials are applied to selected conductors thereof, are collected upon the surfaces of the dielectric at specifically defined locations and constitute an electrical field opposing the electrical field which created them so as to terminate the discharge for the remainder of the half cycle and aid in the initiation of a discharge on a succeeding opposite half cycle of applied voltage, such charges as are stored constituting an electrical memory.

Thus, the dielectric layers prevent the passage of substantial conductive current from the conductor members to the gaseous medium and also serve as collecting surfaces for ionized gaseous medium charges (electrons, ions) during the alternate half cycles of the A.C. operating potentials, such charges collecting first on one elemental or discrete dielectric surface area and then on an opposing elemental or discrete dielectric surface area on alternate half cycles to constitute an electrical memory.

An example of a panel structure containing non-physically isolated or open discharge cells is disclosed in U.S. Pat. No. 3,499,167 issued to Theodore C. Baker, et al.

An example of a panel containing physically isolated cells is disclosed in the article by D. L. Bitzer and H. G. Slottow entitled "The Plasma Display Panel — A Digitally Addressable Display With Inherent Memory", Proceeding of the Fall Joint Computer Conference, IEEE, San Francisco, Calif., November 1966, pages 541–547. Also reference is made to U.S. Pat. No. 3,559,190.

In the construction of the panel, a continuous volume of ionizable gas is confined between a pair of dielectric surfaces backed by conductor arrays typically forming matrix elements. The two conductor arrays may be orthogonally related sets of parallel lines (but any other configuration of conductor arrays may be used). The two arrays define at their intersections a plurality of opposed pairs of charge storage areas on the surfaces of the dielectric bounding or confining the gas. Thus, for a conductor matrix having H rows and C columns the number of elemental or discrete areas will be twice the number of elemental discharge cells.

In addition, the panel may comprise a so-called monolithic structure in which the conductor arrays are created on a single substrate and wherein two or more arrays are separated from each other and from the gaseous medium by at least one insulating member. In such a device the gas discharge takes place not between two opposing elemental areas on two different substrates, but between two contiguous or adjacent elemental areas on the same substrate; the gas being confined between the substrate and an outer retaining wall.

It is also feasible to have a gas discharge device wherein some of the conductive or electrode members are in direct contact with the gaseous medium and the remaining electrode members are appropriately insulated from such gas, i.e., at least one insulated electrode.

In addition to the matrix configuration, the conductor arrays may be shaped otherwise. Accordingly, while the preferred conductor arrangement is of the crossed grid type as discussed herein, it is likewise apparent that where a maximal variety of two dimensional display patterns is not necessary, as where specific standardized visual shapes (e.g., numerals, letters, words, etc.) are to be formed and image resolution is not critical, the conductors may be shaped accordingly (e.g., a segmented digit display).

The gas is selected to produce visible light and invisible radiation which may be used to stimulate a phosphor (if visual display is an objective) and a copious supply of charges (ions and electrons) during discharge.

In the prior art, a wide variety of gases and gas mixtures have beem utilized as the gaseous medium in a number of different gas discharge devices. Typical of such gases include pure gases and mixtures of CO; $CO_2$; halogens; nitrogen; $NH_3$; oxygen; water vapor; hydrogen; hydrocarbons; $P_2O_5$; boron fluoride; acid fumes; $TiCl_4$; air; $H_2O_2$; vapors of sodium, mercury, thallium, cadmium, rubidium, and cesium; carbon disulfide; $H_2S$; deoxygenated air; phosphorus vapors; $C_2H_2$; $CH_4$; naphthalene vapor; anthracene; freon; ethyl alcohol; methylene bromide; heavy hydrogen; electron attaching gases; sulfur hexafluoride; tritium; radioactive gases; and the so-called rare or inert Group VIII gases.

In an open cell Baker, et al. type panel, the gas pressure and the electric field are sufficient to laterally confine charges generated on discharge within elemental or discrete dielectric areas within the perimeter of such areas, especially in a panel containing non-isolated discharge cells. As described in the Baker, et al. patent, the space between the dielectric surfaces occupied by the gas is such as to permit photons generated on discharge in a selected discrete or elemental volume of gas to pass freely through the gas space and strike surface areas of dielectric remote from the selected discrete volumes, such remote, photon struck dielectric surface areas thereby emitting electrons so as to condition at least one elemental volume other than the elemental volume in which the photons originated.

With respect to the memory function of a given discharge panel, the allowable distance or spacing between the dielectric surfaces depends, inter alia, on the frequency of the alternating current supply, the distance typically being greater for lower frequencies.

While the prior art does disclose gaseous discharge devices having externally positioned electrodes for initiating a gaseous discharge, sometimes called "electrodeless discharge", such prior art devices utilized frequencies and spacing or discharge volumes and operating pressures such that although discharges are initiated in the gaseous medium, such discharges are ineffective or not utilized for charge generation and storage at higher frequencies; although charge storage may be realized at lower frequencies, such charge storage has not been utilized in a display/memory device in the manner of the Bitzer-Slottow or Baker, et al. invention.

The term "memory margin" is defined herein as $$M.M. = (V_f - V_E/V_f/2)$$

where $V_f$ is the half-of-peak-to-peak amplitude of the smallest sustaining voltage signal which results in a discharge every half cycle, but at which the cell is not bi-stable and $V_E$ is the half amplitude of the minimum applied voltage sufficient to sustain discharges once initiated.

It will be understood that the basic electrical phenomenon utilized in this invention is the generation of charges (ions and electrons) alternately storable at pairs of opposed or facing discrete points or areas on a pair of dielectric surfaces backed by conductors connected to a source of operating potential. Such stored charges result in an electrical field opposing the field produced by the applied potential that created them and hence operate to terminate ionization in the elemental gas volume between opposed or facing discrete points or areas of dielectric surface. The term "sustain a discharge" means producing a sequence of momentary discharges, at least one discharge for each half cycle of applied alternating sustaining voltage, once the elemental gas volume has been fired, to maintain alternate storing of charges at pairs of opposed discrete areas on the dielectric surfaces.

As used herein, a cell is in the "on state" when a quantity of charge is stored in the cell such that on each half cycle of the sustaining voltage, a gaseous discharge is produced.

In addition to the sustaining voltage, other voltages may be utilized to operate the panel, such as firing, addressing, and writing voltages.

A "firing voltage" is any voltage, regardless of source, required to discharge a cell. Such voltage may be completely external in origin or may be comprised of internal cell wall voltage in combination with externally originated voltages.

An "addressing voltage" is a voltage produced on the panel X — Y electrode coordinates such that at the selected cell or cells, the total voltage applied across the cell is equal to or greater than the firing voltage whereby the cell is discharged.

A "writing voltage" is an addressing voltage of sufficient magnitude to make it probable that on subsequent sustaining voltage half cycles, the cell will be in the "on state".

In the operation of a multiple gaseous discharge device, of the type described hereinbefore, it is necessary to condition the discrete elemental gas volume of each discharge cell by supplying at least one free electron thereto such that a gaseous discharge can be initiated when the cell is addressed with an appropriate voltage signal.

The prior art has disclosed and practiced various means for conditioning gaseous discharge cells.

One such means of panel conditioning comprises a so-called electronic process whereby an electronic conditioning signal or pulse is periodically applied to all of the panel discharge cells, as disclosed for example in British patent specification No. 1,161,832, page 8, lines 56 to 76. Reference is also made to U.S. Pat. No. 3,559,190 and "The Device Characteristics of the Plasma Display Element" by Johnson, et al., IEEE Transactions On Electronic Devices, September, 1971. However, electronic conditioning is self-conditioning and is only effective after a discharge cell has been previously conditioned; that is, electronic conditioning involves periodically discharging a cell and is therefore a way of maintaining the presence of free electrons. Accordingly, one cannot wait too long between the periodically applied conditioning pulses since there must be at least one free electron present in order to discharge and condition a cell.

Another conditioning method comprises the use of external radiation, such as flooding part or all of the gaseous medium of the panel with ultraviolet radiation. This external conditioning method has the obvious disadvantage that it is not always convenient or possible to provide external radiation to a panel, especially if the panel is in a remote position. Likewise, an external UV source requires auxiliary equipment. Accordingly, the use of internal conditioning is generally preferred.

One internal conditioning means comprises using internal radiation, such as by the inclusion of a radioactive material.

Another means of internal conditioning, which we call photon conditioning, comprises using one or more so-called pilot discharge cells in the on-state for the generation of photons. This is particularly effective in a so-called open cell construction (as described in the Baker, et al. patent) wherein the space between the dielectric surfaces occupied by the gas is such as to permit photons generated on discharge in a selected discrete or elemental volume of gas (discharge cell) to pass freely through the panel gas space so as to condition other and more remote elemental volumes of other discharge units. In addition to or in lieu of the pilot cells, one may use other sources of photons internal to the panel.

Internal photon conditioning may be unreliable when a given discharge unit to be addressed is remote in distance relative to the conditioning source, e.g., the pilot cell. Accordingly, a multiplicity of pilot cells may be required for the conditioning of a panel having a large geometric area. In one highly convenient arrangement, the panel matrix border (perimeter) is comprised of a plurality of such pilot cells.

DRAWINGS ILLUSTRATING GAS DISCHARGE DISPLAY/MEMORY PANEL

Reference is made to the accompanying drawings and the hereinafter discussed FIGS. 1 to 4 shown thereon illustrating a gas discharge display/memory panel of the Baker, et al. type.

FIG. 1 is a partially cut-away plan view of a gaseous discharge display/memory panel as connected to a diagrammatically illustrated source of operating potentials.

FIG. 2 is a cross-sectional view (enlarged, but not to proportional scale since the thickness of the gas volume, dielectric members and conductor arrays have been enlarged for purposes of illustration) taken on lines 2 — 2 of FIG. 1.

FIG. 3 is an explanatory partial cross-sectional view similar to FIG. 2 (enlarged, but not to proportional scale).

FIG. 4 is an isometric view of a gaseous discharge display/memory panel.

Figure 5:
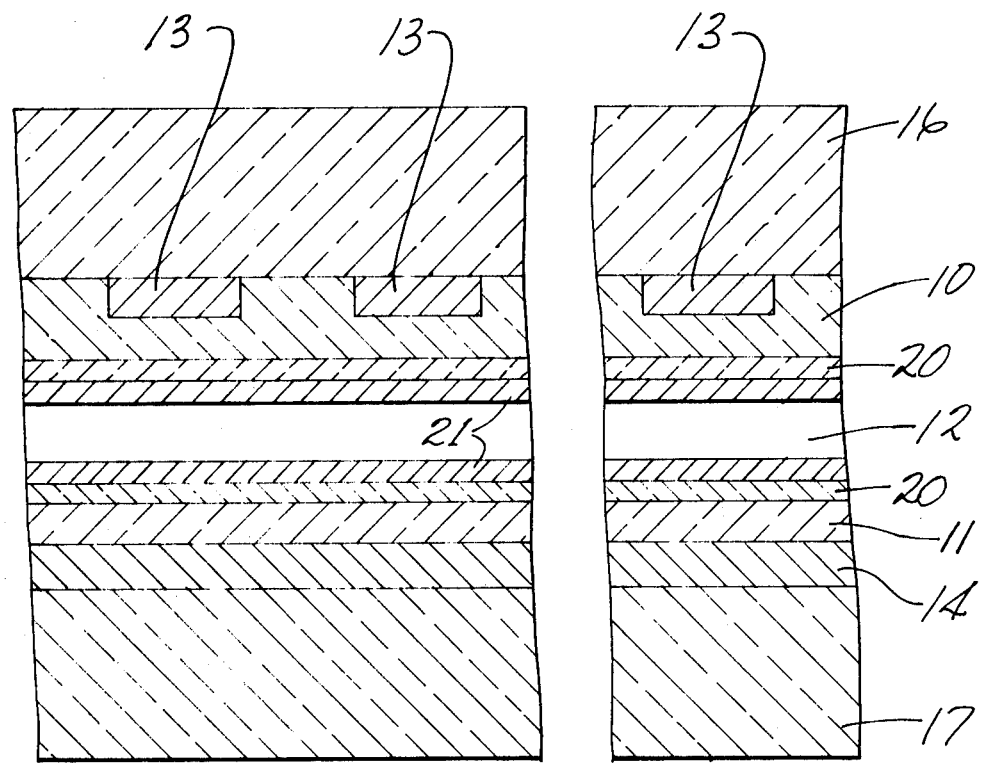
FIG. 5 is a partial cross-sectional view similar to FIG. 3 showing one embodiment of the present invention.

The invention utilizes a pair of dielectric films 10 and 11 separated by a thin layer or volume of a gaseous discharge medium 12, the medium 12 producing a copious supply of charges (ions and electrons) which are alternately collectable on the surfaces of the dielectric members at opposed or facing elemental or discrete areas X and Y defined by the conductor matrix on non-gas-contacting sides of the dielectric members, each dielectric member presenting large open surface areas, and a plurality of pairs of elemental X and Y areas. While the electrically operative structural members such as the dielectric members 10 and 11 and conductor matrixes 13 and 14 are all relatively thin (being exaggerated in thickness in the drawings) they are formed on and supported by rigid nonconductive support members 16 and 17 respectively.

Preferably, one or both of the nonconductive support members 16 and 17 pass light produced by discharge in the elemental gas volumes. Preferably, they are transparent glass members. These members essentially define the overall thickness and strength of the panel. For example, the thickness of gas layer 12 as determined by spacer 15 is usually under 10 mils and preferably about 3 to 8 mils, dielectric layers 10 and 11 (over the conductors at the elemental or discrete X and Y areas) are usually between 0.1 and 2 mils thick, and conductors 13 and 14 at least about 1,000 angstroms thick. However, support members 16 and 17 are much thicker (particularly in larger panels) so as to provide as much ruggedness as may be desired to compensate for stresses in the panel. Support members 16 and 17 also serve as heat sinks for heat generated by discharges and thus minimize the effect of temperature on operation of the device. If it is desired that only the memory function be utilized, then none of the members need be transparent to light.

The electrical properties of support members 16 and 17 are not critical so long as the electrodes are appropriately insulated from one another. The main function of support members 16 and 17 is to provide mechanical support and strength for the entire panel, particularly with respect to pressure differential acting on the panel. Ordinary ¼ inch commercial grade soda lime plate glasses have been used for this purpose. Other glasses such as low expansion glasses or devitrified glass can be used provided they can withstand processing.

Spacer 15 may be made of the same glass material as dielectric films 10 and 11 and may be an integral rib formed on one of the dielectric members and fused to the other members to form a bakeable hermetic seal enclosing and confining the ionizable gas volume 12. However, a separate final hermetic seal may be effected by a high strength devitrified glass sealant 15S. Tubulation 18 is provided for exhausting the space between dielectric members 10 and 11 and filling that space with the volume of ionizable gas. For large panels small beadlike solder glass spacers such as shown at 15B may be located between conductor intersections and fused to dielectric members 10 and 11 to aid in withstanding stress on the panel and maintain uniformity of thickness of gas volume 12.

Conductor arrays 13 and 14 may be formed on support members 16 and 17 by a number of well-known processes, such as photoetching, vacuum deposition, stencil screening,, etc. In the panel shown in FIG. 4 the center-to-center spacing of conductors in the respective arrays is about 17 mils for one typical commercial configuration. Transparent or semi-transparent conductive material such as tin oxide, gold, or aluminum can be used to form the conductor arrays and should have a resistance less than 3000 ohms per line. Alternately, narrow opaque electrodes may be used so that discharge light passes the edges of the electrodes to reach the viewer. It is important to select a conductor material that is not attacked during processing by the dielectric material.

It will be appreciated that conductor arrays 13 and 14 may be wires or filaments of copper, gold, silver or aluminum or any other conductive metal or material. For example 1 mil wire filaments are commercially available and may be used in the invention. However, formed in situ conductor arrays are preferred since they may be more easily and uniformly placed on and adhered to the support plates 16 and 17.

Dielectric layer members 10 and 11 are formed of an inorganic material and are preferably formed in situ as an adherent film or coating which is not chemically or physically affected during bake-out of the panel. One such material is a solder glass such as Kimble SG-68 manufactured by and commercially available from the assignee of the present invention.

This glass has thermal expansion characteristics substantially matching the thermal expansion characteristics of certain soda-lime glasses, and can be used as the dielectric layer when the support members 16 and 17 are soda-lime glass plates. Dielectric layers 10 and 11 should have a dielectric breakdown voltage of about 1000 v. and be electrically homogeneous on a microscopic scale (e.g., no cracks, bubbles, dirt, surface films, etc.). In addition, the surfaces of dielectric layers 10 and 11 should be good photoemitters of electrons in a baked out condition. Alternatively, dielectric layers 10 and 11 may be overcoated with materials designed to produce good electron emission, as in U.S. Pat. No. 3,634,719, issued to Roger E. Ernsthausen. Of course, for an optical display at least one of dielectric layers 10 and 11 should pass light generated on discharge and be transparent or translucent and, preferably, both layers are optically transparent.

The preferred spacing between the facing surfaces of the two dielectric films is about 3 to 8 mils if the conductor arrays 13 and 14 have center-to-center spacing of about 17 mils.

The ends of conductors 14-1 . . . 14-4 and support members 17 extend beyond the enclosed gas volume 12 and are exposed for the purpose of making electrical connection to interface and addressing circuitry 19. Likewise, the ends of conductors 13-1 . . . 13-4 on support member 16 extend beyond the enclosed gas volume 12 and are exposed for the purpose of making electrical connection to interface and addressing circuitry 19.

As in known display systems, the interface and addressing circuitry or system 19 may be relatively inexpensive line scan systems or the somewhat more expensive high speed random access systems. In either case, it is to be noted that a lower amplitude of operating potentials helps to reduce problems associated with the interface circuitry between the addressing system and the display/memory panel, per se. In addition, by providing a panel having greater uniformity in discharge characteristics throughout the panel, manufacturing tolerances of the interfacing circuitry can be made less rigid.

One mode of initiating operation of the panel will be described with reference to FIG. 3, which illustrates the condition of one elemental gas volume 30 having an elemental cross-sectional area and volume which is quite small relative to the entire volume and cross-sectional area of gas 12. The cross-sectional area of volume 30 is defined by the overlapping common elemental areas of the conductor arrays and the volume is equal to the product of the distance between the dielectric surfaces and the elemental area. It is apparent that if the conductor arrays are uniform and linear and are orthogonally (at right angles to each other) related each of elemental areas X and Y will be squares and if conductors of one conductor array are wider than conductors of the other conductor arrays, said areas will be rectangles. If the conductor arrays are at transverse angles relative to each other, other than 90°, the areas will be diamond shaped so that the cross-sectional shape of each volume is determined solely in the first instance by the shape of the common area of overlap between conductors in the conductor arrays 13 and 14. The dotted lines 30' are imaginary lines to show a boundary of one elemental volume about the center of which each elemental discharge takes place. It is known that the cross-sectional area of the discharge in a gas is affected by, inter alia, the pressure of the gas, such that, if desired, the discharge may even be constricted to within an area smaller than the area of conductor overlap. By utilization of this phenomena, the light production may be confined or resolved substantially to the area of the elemental cross-sectional area defined by conductor overlap. Moreover, by operating at such pressure charges (ions and electrons) produced on discharge are laterally confined so as to not materially affect operation of adjacent elemental discharge volumes.

In the instance shown in FIG. 3, a conditioning discharge about the center of elemental volume 30 has been initiated by application to conductor 13-1 and conductor 14-1 firing potential $V_x'$ as derived from a source 35 of variable phase, for example, and source 36 of sustaining potential $V_s$ (which may be a sine wave, for example). The potential $V_x'$ is added to the sustaining potential $V_s$ as sustaining potential $V_s$ increases in magnitude to initiate the conditioning discharge about the center of elemental volume 30 shown in FIG. 3. There, the phase of the source 35 of potential $V_x'$ has been adjusted into adding relation to the alternating voltage from the source 36 of sustaining voltage $V_s$ to provide a voltage $V_f'$, when switch 33 has been closed, to conductors 13-1 and 14-1 defining elementary gas volume 30 sufficient (in time and/or magnitude) to produce a light generating discharge centered about discrete elemental gas volume 30. At the instant shown, since conductor 13-1 is positive, electrons 32 have collected on and are moving to an elemental area of dielectric member 10 substantially corresponding to the area of elemental gas volume 30 and the less mobile positive and the less mobile positive ions 31 are beginning to collect on the opposed elemental area of dielectric member 11 since it is negative. As these charges build up, they constitute a back voltage opposed to the voltage applied to conductors 13-1 and 14-1 and serve to terminate the discharge in elemental gas volume 30 for the remainder of a half cycle.

During the discharge about the center of elemental gas volume 30, photons are produced which are free to move or pass through gas medium 12, as indicated by arrows 37, to strike or impact remote surface areas of photoemissive dielectric members 10 and 11, causing such remote areas to release electrons 38. Electrons 38 are created in every other discrete elemental gas volumes, and condition these volumes for operation at a firing potential $V_f$ which is lower in magnitude than the firing potential $V_f'$ for the initial discharge.

Thus, elimination of physical obstructions or barriers between discrete elemental volumes permits photons to travel via the space occupied by the gas medium 12 to remote surface areas of dielectric members 10 and 11 and provides a mechanism for supplying free electrons to all elemental gas volumes, thereby conditioning all discrete elemental gas volumes for subsequent discharges, respectively, at a substantially uniform lower applied potential. While in FIG. 3 a single elemental volume 30 is shown, it will be appreciated that an entire row (or column) of elemental gas volumes may be maintained in a "fired" condition during normal operation of the device with the light produced thereby being masked or blocked off from the normal viewing area and not used for display purposes. It can be expected that in some applications there will always be at least one elemental volume in a "fired" condition and producing light in a panel, and in such applications it is not necessary to provide separate discharge or generation of photons for purposes described earlier.

However, as described earlier, the entire gas volume can be conditioned for operation at uniform firing potentials by use of external or internal radiation so that there will be no need for a separate source of higher potential for initiating an initial discharge. Thus, by irradiating the panel with ultraviolet radiation or by including a radioactive material within the glass materials or gas space, all discharge volumes can be operated at uniform potentials from addressing and interface circuit 19.

Since each discharge is terminated upon a build-up or storage of charges at opposed pairs of elemental areas, the light produced is likewise terminated. In fact, light production lasts for only a small fraction of a half cycle of applied alternating potential and, depending on design parameters, is typically in the submicrosecond range.

After the initial firing or discharge of discrete elemental gas volume 30 by a firing potential $V_f'$, switch 33 may be opened so that only the sustaining voltage $V_s$ from source 36 is applied to conductors 13-1 and 14-1. Due to the storage of charges at the opposed elemental areas X and Y, the elemental gas volume 30 will discharge again at or near the peak of the following half cycle of $V_s$ (which is of opposite polarity) to again produce a momentary pulse of light. At this time, due to reversal of field direction, electrons 32 will collect on and be stored on elemental surface area Y of dielectric member 11 and positive ions 31 will collect and be stored on elemental surface area X of dielectric member 10. After a few cycles of sustaining voltage $V_s$, the times of discharges become symmetrically located with respect to the wave form of sustaining voltage $V_s$. At remote elemental volumes, as for example, the elemental volumes defined by conductor 14-1 with conductors 13-2 and 13-3, a uniform magnitude or potential $V_x$ from source 60 is selectively added by one or both of switches 34-2 or 34-3 to the sustaining voltage $V_s$, shown as 36', to fire one or both of these elemental discharge volumes. Due to the presence of free electrons produced by photons from the discharge centered about elemental volume 30, each of these remote discrete elemental volumes have been conditioned for operation at uniform firing potential $V_f$.

In order to turn "off" an elemental gas volume (i.e., terminate a sequence of discharges representing the "on" state), the sustaining voltage may be removed. However, since this would also turn "off" other elemental volumes along a row or column, it is preferred that the volumes be selectively turned "off" by application to selected "on" elemental volumes a voltage which can neutralize the charges stored at the pairs of opposed elemental areas.

This can be accomplished in a number of ways, as for example, varying the phase or time position of the potential from source 60 to where that voltage combined with the potential from source 36' falls substantially below the sustaining voltage.

It is apparent that the plates 16–17 need not be flat but may be curved, curvature of facing surfaces of each plate being complementary to each other, so that the gap between plates remains substantially uniform over their entire surfaces. While the preferred conductor arrangement is of the crossed grid type as shown herein, it is likewise apparent that where an infinite variety of two dimensional display patterns are not necessary, as where specific standardized visual shapes (e.g., numerals, letters, words, etc.) are to be formed and image resolution is not critical, the conductors may be shaped accordingly. Reference is made to British Patent Specification No. 1,302,148 and U.S. Pat. No. 3,711,733 wherein non-grid electrode arrangements are illustrated.

The device shown in FIG. 4 is a panel having a large number of elemental volumes similar to elemental volume 30 (FIG. 3). In this case more room is provided to make electrical connection to the conductor arrays 13' and 14', respectively, by extending the surfaces of support members 16' and 17' beyond seal 15S', alternate conductors being extended on alternate sides. Support members 16' and 17' are transparent. The dielectric coatings are not shown in FIG. 4 but are likewise transparent so that the panel may be viewed from either side.

In addition to gas discharge display/memory devices, as generally and specifically described hereinbefore, this invention also relates to gas discharge devices not containing dielectric members and wherein the electrodes are in direct contact with an ionizable gas medium. Such direct contact devices are well known in the prior art. Reference is made to Cold Cathode Glow Discharge Tubes, a text by G. F. Weston, London, J. W. Arrowsmith Ltd., 1968.

In gas discharge devices of the aforementioned types, phosphors may be appropriately positioned within the device so as to be activated by radiation from the gas discharge of the device. For example, in a charge storage device, of the Baker, et al. type, phosphors can be positioned on or embedded in one or more charge storage dielectric surfaces.

Such phosphor-containing devices are useful for a variety of purposes, especially for color display. However, the phosphor life characteristics may tend to be affected by the presence of the gas discharge, e.g., due to degradation by particle or photon bombardment.

THE INVENTION

In accordance with the practice of this invention, there is provided a gas discharge device containing a phosphor which is excited at least in part by radiation from the gas discharge of the device, the life of the phosphor being increased by a relatively thin overcoat of a selected material which is at least partially transmissive to the gas discharge radiation.

The overcoat has a thickness sufficient to screen out undesirable radiation so as to increase the phosphor life, while transmitting excitation radiation.

In the preferred practice hereof, there is used an overcoat material having at least one relatively high coefficient of secondary emission of electrons when struck by photons, ions, metastable atoms, or metastable molecules.

Although a wide variety of overcoat materials are contemplated, there is typically used an alkali fluoride, such as LiF or NaF, or an alkaline earth fluoride, such as $BaF_2$, $CaF_2$, $MgF_2$, or $SrF_2$.

Furthermore, a wide variety of other phosphor overcoat materials are contemplated, such as the oxides of lead, aluminum. titanium, zirconium, hafnium, silicon, etc.

The phosphor overcoat is applied to the phosphor by any convenient method including not by way of limitation vapor deposition; vacuum deposition; chemical vapor deposition; wet spraying or settling upon the phosphor a mixture or solution of the overcoat suspended or dissolved in a liquid followed by evaporation of the liquid; silk screening, dry spraying of the ovecoat upon the phosphor; electron beam evaporation; plasma flame and/or arc spraying and/or deposition; thermal evaporation; laser evaporation; RF or induction heating evaporation; and sputtering target techniques.

As used herein the term "phosphor overcoat" is intended to be all inclusive of other similar terms such as deposit, coating, finish, spread, covering, etc.

In the practice of this invention, it is contemplated using any suitable luminescent phosphor. In the preferred embodiment, the phosphor is photoluminescent. The term "photoluminescent phosphor" includes quite generally all solid and liquid, inorganic and organic materials capable of converting an input of absorbed photons into an output of photons of different energy, the output comprising visible light of a brightness and intensity sufficient for visual display.

Typical photoluminescent phosphors contemplated include not by way of limitation both activated and non-activated compounds, e.g., the sulfides such as zinc sulfides, zinc-cadmium sulfides, zinc-sulfo-selenides; the silicates such as zinc silicates, zinc beryllo-silicate, Mg silicates; the tungstates such as calcium tungstates, magnesium tungstates; the phosphates, borates and arsenates such as calcium phosphates, cadmium borates, zinc borates, magnesium arsenates; and the oxides and halides such as self-activated zinc oxide, magnesium fluorides, magnesium fluorogermanate. Typical activators include not by way of limitation Mn, Eu, Ce, Pb, etc.

In the practice hereof, it is possible to produce multi-color displays by the use of two or more phosphors with different colored phosphors at adjacent electrode intersections. This allows control of the discharge so as to excite only the color desired. In this manner, one could, for example, produce red characters on a green background for a more striking visual display.

Another extension is the use of three color dots, as commonly used in cathode ray tubes, to obtain multicolor displays. To get true color pictures a means of controlling the intensity of the light from each color is necessary. Possible ways of doing this are varying the voltage applied to the discharge exciting a particular color; varying duration of discharge; use of multi-layers of glass and phosphor, possibly with transparent electrodes; and addressing the various layers independently.

In the practice of this invention, it is contemplated using radiation from any suitable ionized gaseous medium to excite the overcoated phosphor.

In the prior art, a wide variety of gases and gas mixtures have been utilized as the gaseous medium in a gas discharge device. Typical of such gases include CO; $CO_2$; halogens; nitrogen, $NH_3$; oxygen; water vapor; hydrogen; hydrocarbons; $P_2O_5$; boron fluoride; acid fumes; $TiCl_4$; Group VIII gases; air; $H_2O_2$; vapors of sodium, mercury, thallium, cadmium, rubidium, and cesium; carbon disulfide; laughing gas; $H_2S$; deoxygenated air; phosphorus vapors; $C_2H_2$; $CH_4$; naphthalene vapor; anthracene; freon; ethyl alcohol; methylene bromide; heavy hydrogen; electron attaching gases; electron free gases; sulfur hexafluoride; tritium; radioactive gases; and the rare or inert gases.

In one embodiment hereof, the gaseous medium comprises at least one rare gas selected from neon or argon and at least one other rare gas selected from argon, xenon, or krypton.

In another embodiment, the gaseous medium comprises about 80 percent to about 99.9 percent atoms of neon and about 20 percent to about 0.1 percent atoms of at least one member selected from argon, xenon, or krypton.

In another embodiment, the gaseous medium comprises one or more rare gases selected from argon, xenon, or krypton.

Beneficial amounts of other additives, such as mercury and/or helium, may also be present in the gaseous medium.

The gaseous medium may be used solely for phosphor stimulation. Likewise, the gaseous medium may be used for the dual function of phosphor stimulation and the combining of color output from the ionized medium with color output from the phosphor.

Typically the gaseous medium has a pressure within the gas discharge device of about 50 to about 1500 Torr, usually about 200 to about 800 Torr.

As noted hereinbefore, the use of a selected phosphor overcoat is especially beneficial in that it increases the life of the phosphor.

As used herein "phosphor life" is defined as including the length of time required for reduction of light output (in radiometric or photometric units) by some fixed amount, such as 50 percent.

When the selected overcoat material is a high secondary emitter, the need for special phosphor geometry, configuration, and/or registration is minimized, perhaps even eliminated.

FIG. 5 illustrates one practice of this invention utilizing a cross-sectional view as in FIG. 3.

In FIG. 5 there is shown substrates 16 and 17, electrodes 13 and 14, gaseous medium 12, dielectric members 10, 11, phosphor 20, and phosphor overcoat 21.

We claim:

1. In an information display gas discharge device containing opposing electrode arrays defining coplanar multiple gas discharge units in said device, each having a discharge gap under about 10 mils, an ionizable gaseous medium, and a phosphor means selectively excited at least in part by radiation from a selected one of said gas discharge units in the device, the improvement comprising an overcoat on said phosphor, said overcoat being selected from the group consisting of alkali and alkaline earth fluorides, being at least partially transmissive to phosphor excitation radiation from the gas discharge and being of a material having a relatively high coefficient of secondary emission of electrons when struck by photons, ions, metastable atoms, or metastable molecules for conditioning of the gaseous medium and the thickness of said overcoat being sufficient to screen out undesirable particles and radiation to increase the life of the phosphor.

2. The invention of claim 1 wherein the gaseous medium comprises at least one rare gas selected from the group consisting of neon and argon and at least one other gas selected from the group consisting of xenon and krypton, and argon when neon is the first selected gas.

3. In an information display gas discharge device containing opposing electrode arrays defining coplanar multiple gas discharge units in said device, each having a discharge gap under about 10 mils, an ionizable gaseous medium, and a phosphor means selectively excited at least in part by radiation from a selected one of said gas discharge units in the device, the improvement comprising an overcoat on said phosphor, said overcoat being selected from the grop consisting of LiF, NaF, $BaF_2$, $CaF_2$, $MgF_2$ and $SrF_2$, being at least partially transmissive to phosphor excitation radiation from the gas discharge and being of a material having a relatively high coefficient of secondary emission of electrons when struck by photons, ions, metastable atoms, or metastable molecules for conditioning of the gaseous medium ant the thickness of said overcoat being sufficient to screen out undesirable particles and radiation to increase the life of the phosphor.

4. The invention of claim 3 wherein the gaseous medium comprises about 80 percent to about 99.9 percent atoms of at least one member selected from the group consisting of argon, xenon and krypton.

5. In a process for manufacturing a gas discharge information display/memory device containing electrode arrays defining multiple discharge units having discharge gaps under about 10 mils, an ionizable gaseous medium in said gaps, and a phosphor to be excited at least in part by radiation from the gas discharge of the device, the improvement which comprises applying an overcoat to the phosphor, said overcoat being selected from the group consisting of alkali and alkaline earth fluorides, being at least partially transmissive to phosphor excitation radiation from the gas discharge and being of a material having a relatively high coefficient of secondary emission of electrons when struck by photons, ions, metastable atoms, or metastable molecules for conditioning of the gaseous medium and the thickness of said overcoat being sufficient to screen out undesirable particles and radiation to increase the life of the phosphor, said gaseous medium comprising at least one rare gas selected from the group consisting of neon and argon and at least one other gas selected from the group consisting of xenon and krypton, and argon when neon is the first selected gas.

6. In a process for manufacturing a gas discharge information display/memory device containing electrode arrays defining multiple discharge units having discharge gaps under about 10 mils, an ionizable gaseous medium in said gaps, and a phosphor to be excited at least in part by radiation from the gas discharge of the device, the improvement which comprises applying an overcoat to the phosphor, said overcoat being selected from the group consisting of LiF, NaF, BaF$_2$, CaF$_2$, MgF$_2$ and SrF$_2$, being at least partially transmissive to phosphor excitation radiation from the gas discharge and being of a material having a relatively high coefficient of secondary emission of electrons when struck by photons, ions, metastable atoms, or metastable molecules for conditioning of the gaseous medium and the thickness of said overcoat being sufficient to screen out undesirable particles and radiation to increase the life of the phosphor, said gaseous medium comprising at least one rare gas selected from the group consisting of neon and argon and at least one other gas selected from the group consisting of xenon and krypton, and argon when neon is the first selected gas.

7. The invention of claim 6 wherein the gaseous medium comprises about 80 percent to about 99.9 percent atoms of neon and about 20 percent to about 0.1 percent atoms of at least one member selected from the group consisting of argon, xenon and krypton.

8. In a gaseous discharge information display/memory panel comprising an ionizable gaseous medium in a gas chamber formed by a pair of opposed dielectric material members backed by electrode members, the electrode members behind each dielectric material member being transversely oriented relative to the electrode members behind the opposing dielectric material member so as to define a plurality of discharge units, each such discharge unit having a discharge gap under about 10 mils, and at least one of said dielectric material members comprising a photoluminescent phosphor excited at least in part by radiation from discharge of the gaseous medium such that the phosphor in the excited state emits visible light, the improvement comprising an overcoat on said photoluminescent phosphor, said overcoat being selected from the group consisting of alkali and alkaline earth fluorides, and being at least partially transmissive to phosphor excitation radiation from the discharge of the gaseous medium to produce photoluminescence of visible light only from a selected excited discharge unit, the thickness of said overcoat being sufficient to screen out undesirable particles and radiation to increase the life of the phosphor and said overcoat being of a material which has a relatively high coefficient of secondary emission of electrons when struck of photons, ions, metastable atoms, or metastable molecules for conditioning of the gaseous medium.

9. The invention of claim 8 wherein said phosphor is incorporated in said dielectric material.

10. The invention of claim 8 wherein said phosphor is positioned on the surface of said dielectric material confronting said gaseous medium.

11. The invention of claim 8 wherein the gaseous medium comprises at least one rare gas selected from the group consisting of neon and argon and at least one other gas selected from the group consisting of xenon and krypton, and argon when neon is the first selected gas.

12. The invention of claim 8 wherein the gaseous medium comprises about 80 percent to about 99.9 percent atoms of at least one member selected from the group consisting of argon, xenon and krypton.

13. In a gaseous discharge information display/memory panel comprising an ionizable gaseous medium in a gas chamber formed by a pair of opposed dielectric material members backed by electrode members, the electrode members behind each dielectric material member being transversely oriented relative to the electrode members behind the opposing dielectric material member so as to define a plurality of discharge units, each such discharge unit having a discharge gap under about 10 mils, and at least one of said dielectric material members comprising a photoluminescent phosphor excited at least in part by radiation from discharge of the gaseous medium such that the phosphor in the excited state emits visible light, the improvement comprising an overcoat on said photoluminescent phosphor, said overcoat being selected from the group consisting of LiF, NaF, BaF$_2$, CaF$_2$, MgF$_2$ and SrF$_2$, and being at least partially transmissive to phosphor excitation radiation from the discharge of the gaseous medium to produce photoluminescence of visible light only from a selected excited discharge unit, the thickness of said overcoat being sufficient to screen out undesirable particles and radiation to increase the life of the phosphor and said overcoat being of a material which has a relatively high coefficient of secondary emission of electrons when struck by photons, ions, metastable atoms, or metastable molecules for conditioning of the gaseous medium.

* * * * *